(12) United States Patent
Lin et al.

(10) Patent No.: US 11,222,440 B2
(45) Date of Patent: Jan. 11, 2022

(54) POSITION AND POSE DETERMINING METHOD, APPARATUS, SMART DEVICE, AND STORAGE MEDIUM

(71) Applicant: Tencent Technology (Shenzhen) Company Limited, Shenzhen (CN)

(72) Inventors: Xiangkai Lin, Shenzhen (CN); Liang Qiao, Shenzhen (CN); Fengming Zhu, Shenzhen (CN); Yu Zuo, Shenzhen (CN); Zeyu Yang, Shenzhen (CN); Yonggen Ling, Shenzhen (CN); Linchao Bao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 43 days.

(21) Appl. No.: 16/913,144

(22) Filed: Jun. 26, 2020

(65) Prior Publication Data

US 2020/0327692 A1 Oct. 15, 2020

Related U.S. Application Data

(63) Continuation of application No. PCT/CN2019/079342, filed on Mar. 22, 2019.

(30) Foreign Application Priority Data

Apr. 27, 2018 (CN) .......................... 201810391549.6

(51) Int. Cl.
 *G06T 7/73* (2017.01)
 *G06K 9/46* (2006.01)
(52) U.S. Cl.
 CPC .............. *G06T 7/73* (2017.01); *G06K 9/4604* (2013.01); *G06T 2207/30204* (2013.01)

(58) Field of Classification Search
 CPC .......... G06T 7/246; G06T 7/248; G06T 7/70; G06T 7/73; G06T 7/74; G06T 7/80;
 (Continued)

(56) References Cited

U.S. PATENT DOCUMENTS 9,648,303 B1 * 5/2017 Resch et al. .............. G06T 7/73
2012/0293635 A1 11/2012 Sharma et al.
(Continued)

FOREIGN PATENT DOCUMENTS

CN 102819845 A 12/2012
CN 103198488 A 7/2013
(Continued)

OTHER PUBLICATIONS

Tencent Technology, WO, PCT/CN2019/079342, Jun. 25, 2019, 5 pgs.

(Continued)

*Primary Examiner* — Andrew W Johns
(74) *Attorney, Agent, or Firm* — Morgan, Lewis & Bockius LLP

(57) ABSTRACT

Embodiments of this application disclose a position and pose determining method performed at an electronic device. The method includes: acquiring, by tracking a first feature point extracted from a marked image, position and pose parameters of a first image captured by a camera relative to the marked image; extracting a second feature point from the first image in a case that the first image fails to meet a feature point tracking condition; and acquiring, by tracking the first feature point and the second feature point, position and pose parameters of a second image captured by the camera relative to the marked image, and determining a position and a pose of the camera according to the position and pose parameters, the second image being an image captured by the camera after the first image.

20 Claims, 7 Drawing Sheets

(58) Field of Classification Search
CPC ............ G06T 7/97; G06T 2207/30204; G06T 2207/30244; G06K 9/46; G06K 9/4604
See application file for complete search history.

(56) References Cited

U.S. PATENT DOCUMENTS

| | | |
|---|---|---|
| 2015/0186746 A1 | 7/2015 | Martini |
| 2019/0026919 A1* | 1/2019 | Aratani .............. G02B 27/0172 |
| 2020/0005469 A1* | 1/2020 | Daniilidis et al. ..... H04N 5/232 |

FOREIGN PATENT DOCUMENTS

| | | |
|---|---|---|
| CN | 106373141 A | 2/2017 |
| CN | 107869989 A | 4/2018 |
| CN | 108682036 A | 10/2018 |

OTHER PUBLICATIONS

Tencent Technology, IPRP, PCT/CN2019/079342, Oct. 27, 2020, 6 pgs.

Miao Jinghua et al., "Real-time Camera Pose Tracking with Locating Image Patching Scales and Regions," Journal of Image and Graphics, vol. 22, No. 7, Jul. 31, 2017, pp. 957-968.

Zhang, Peike et al. "Improved Solution for Relative Pose Based on Homography Matrix," Computer Engineering and Applications, Aug. 31, 2017, pp. 25-30.

Tencent Technology, ISR, PCT/CN2019/079342, Jun. 25, 2019, 2 pgs.

\* cited by examiner

POSITION AND POSE DETERMINING METHOD, APPARATUS, SMART DEVICE, AND STORAGE MEDIUM

CROSS-REFERENCE TO RELATED APPLICATIONS

This application is a continuation application of PCT Patent Application No. PCT/CN2019/079342, entitled "POSE DETERMINATION METHOD AND DEVICE, INTELLIGENT APPARATUS, AND STORAGE MEDIUM" filed on Mar. 22, 2019, which claims priority to Chinese Patent Application No. 201810391549.6, entitled "POSITION AND POSE DETERMINING METHOD AND APPARATUS, AND STORAGE MEDIUM" filed Apr. 27, 2018, all of which are incorporated by reference in their entirety.

FIELD OF THE TECHNOLOGY

Embodiments of this application relate to the field of computer technologies, and in particular, to a position and pose determining method and apparatus, a smart device, and a storage medium.

BACKGROUND OF THE DISCLOSURE

An augmented reality (AR) technology is a technology for tracking a position and a pose of a camera in real time and displaying the position and the pose in combination with a virtual image, video, or three-dimensional model, and may display a virtual scene in combination with an actual scene. The augmented reality is a significant research direction in a current computer vision field. The most important issue in the AR technology is how to accurately determine the position and pose of the camera.

A method for determining the position and pose of the camera by tracking a feature point in a marker image is provided in related art. The method includes the following: a marker image is determined in advance, a feature point is extracted in the marker image, the extracted feature point is tracked with a change in the position or pose of the camera, and every time when one image is currently captured by the camera, the feature point in the marker image is recognized in the current image, so that a position and a pose of the feature point in the current image is compared with a position and pose of the feature point in the marker image to obtain position and pose parameters of the feature point, further obtaining position and pose parameters of the current image relative to the marker image, such as a rotation parameter and a displacement parameter. The position and pose parameters may represent the position and the pose of the camera during capturing of the current image.

During implementation of an embodiment of this application, it is found that at least the following problem exists in the related art: In a case that the position or pose of the camera is changed excessively, so that no feature point exists in the current, the feature point cannot be tracked, and then the position and pose of the camera cannot be determined.

SUMMARY

Embodiments of this application provide a position and pose determining method and apparatus, a smart device, and a storage medium to resolve a problem in the related art. The technical solutions are as follows:

In a first aspect, a position and pose determining method is performed at an electronic device having one or more processors and memory storing a plurality of programs to be executed by the one or more processors, and the method comprising:

acquiring, by tracking a first feature point extracted from a marked image, position and pose parameters of a first image captured by a camera relative to the marked image;

extracting a second feature point from the first image in a case that the first image fails to meet a feature point tracking condition, the second feature point being different from the first feature point; and acquiring, by tracking the first feature point and the second feature point, position and pose parameters of a second image captured by the camera relative to the marked image, and determining a position and a pose of the camera according to the position and pose parameters, the second image being an image captured by the camera after the first image.

In a second aspect, a position and pose determining apparatus is provided, including:

a first acquiring module configured to acquire, by tracking a first feature point, position and pose parameters of a first image captured by a camera relative to a marked image, the first feature point being extracted from the marked image;

a feature point processing module configured to extract a second feature point from the first image in a case that the first image fails to meet a feature point tracking condition, the second feature point being different from the first feature point; and a second acquiring module configured to acquire, by tracking the first feature point and the second feature point, position and pose parameters of a second image captured by the camera relative to the marked image, and determining a position and a pose of the camera according to the position and pose parameters, the second image being an image captured by the camera after the first image.

In a third aspect, a smart device is provided, including: a memory and one or more processors, and a plurality of programs stored in the memory, wherein the plurality of programs, when executed by the one or more processors, cause the electronic device to perform a plurality of operations including:

acquiring, by tracking a first feature point extracted from a marked image, position and pose parameters of a first image captured by a camera relative to the marked image;

extracting a second feature point from the first image in a case that the first image fails to meet a feature point tracking condition, the second feature point being different from the first feature point; and acquiring, by tracking the first feature point and the second feature point, position and pose parameters of a second image captured by the camera relative to the marked image, and determining a position and a pose of the camera according to the position and pose parameters, the second image being an image captured by the camera after the first image.

In a fourth aspect, a non-transitory computer readable storage medium is provided, the computer readable storage medium storing at least one instruction, at least one program, a code set, or an instruction set, the instruction, the program, the code set, or the instruction set being loaded by the processor and having operations to implement the position and pose determining method in the first aspect.

Beneficial effects brought by the technical solutions provided in the embodiments of this application include at least the following.

In the method, apparatus, smart device, and storage medium according to the embodiment of this application, during acquisition of position and pose parameters of an image captured by the camera relative to a marked image by tracking the first feature point, in a case that the first image fails to meet a feature point tracking condition, a second feature point is extracted from the first image, the position and pose parameters of the image captured by the camera relative to the marked image are acquired by tracking the first feature point and the second feature point, so that the position and pose of the camera are determined, and a new feature point is extracted in a case that the image fails to meet the feature point tracking condition, preventing a failure of tracking a feature point due to excessive changes in the position or pose of the camera, increasing robustness, and improving tracking accuracy of the camera.

In addition, no marked image is needed to be preset, and a current scene is only needed to be captured to obtain one image that is determined as the initial marked image, so that the marked image may be initialized, getting rid of a limitation of presetting of the marked image and expanding an application scope.

In addition, the grid areas are used for filtering feature points to ensure that only one feature point is included in one grid area and a plurality of feature points are not concentrated in the same area, ensuring spatial dispersion between feature points, thereby improving the tracking accuracy.

In addition, the homography matrix is decomposed to obtain the position and pose parameters, preventing a complex tracking algorithm, causing a more stable and smooth result without jitter, which is especially applicable to an AR scene.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

An embodiment of this application provides a position and pose determining method applied to a scene in which a smart device tracks a position and a pose of a camera, especially an AR scene. In a case that a smart device performs display by using an AR technology, such as display of an AR game or an AR video, etc., the position and the pose of the camera needs to be tracked.

A camera and a display unit are configured for the smart device. The camera is configured to capture an image of a real scene, and the display unit is configured to display a scene interface formed by combining the real scene with a virtual scene. As the camera is moved, the smart device may track changes in the position and pose of the camera, and may further capture an image of the real scene, and display a plurality of currently captured images in sequence according to the changes in the position and pose of the camera, thereby simulating an effect of displaying a three-dimensional interface. In addition, a virtual element may be added to a displayed image, such as a virtual image, a virtual video, or a virtual three-dimensional model, etc. As the camera is moved, the virtual element may be displayed in different manners according to changes in the position and pose of the camera, thereby simulating an effect of displaying a three-dimensional virtual element. The image of the real scene is combined with the virtual element for display to form the scene interface, so that an effect that the real scene and the virtual element are in the same three-dimensional space.

Figure 1:
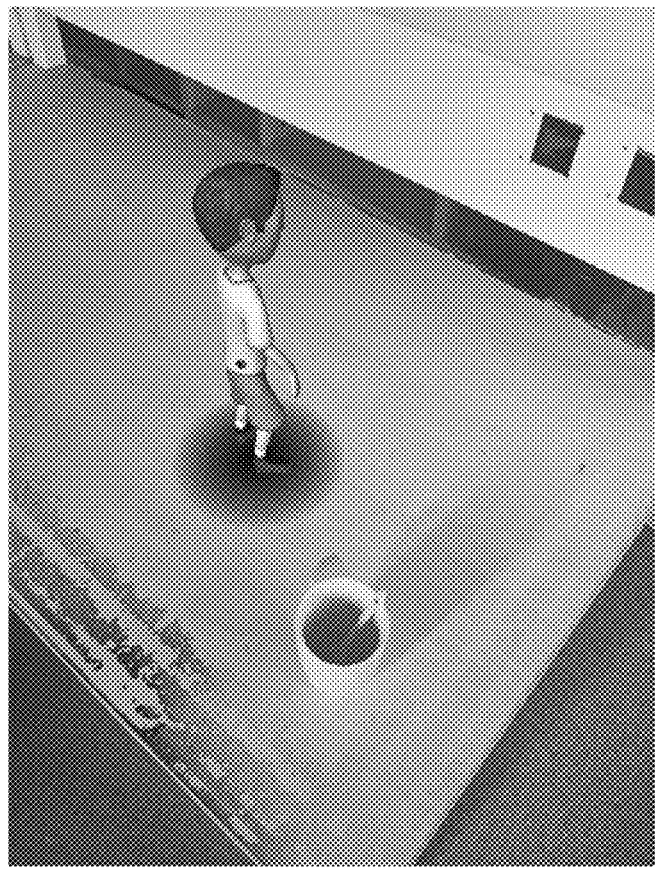
FIG. 1 is a schematic display diagram of one scene interface according to an embodiment of this application.
Figure 2:
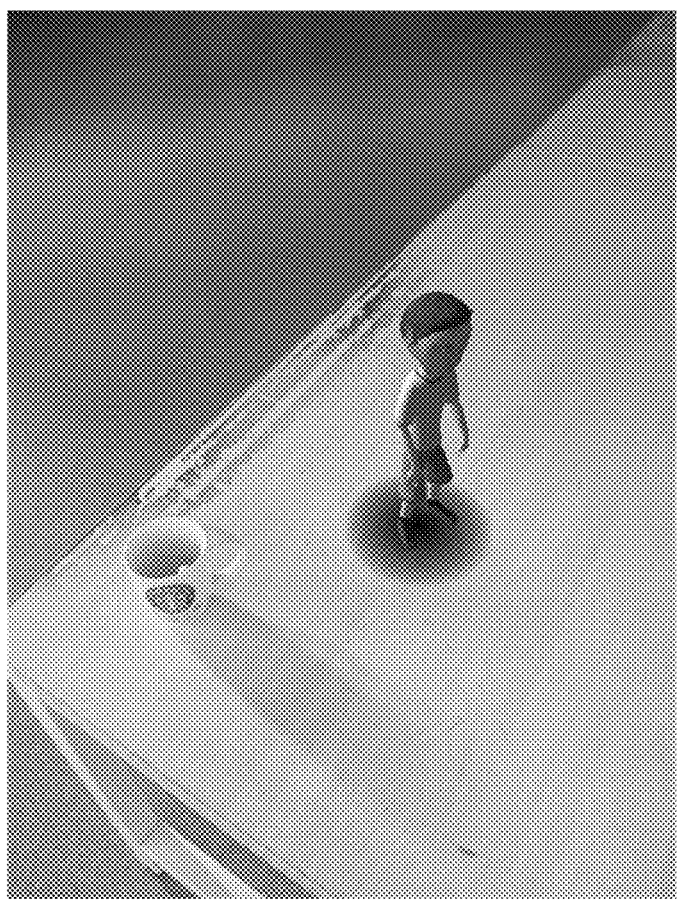
FIG. 2 is a schematic display diagram of the other scene interface according to an embodiment of this application.

For example, referring to both FIG. 1 and FIG. 2, the smart device adds a virtual character to a captured image including a table and a tea cup. As the camera is moved, the captured image is changed, and a capture orientation of the virtual character is also changed, simulating an effect that the virtual character is stationary in the image relative to the table and the tea cup, and the camera simultaneously captures, with the changes in the position and pose, the table, the tea cup, and the virtual character, presenting the user with a real three-dimensional picture.

Figure 3:
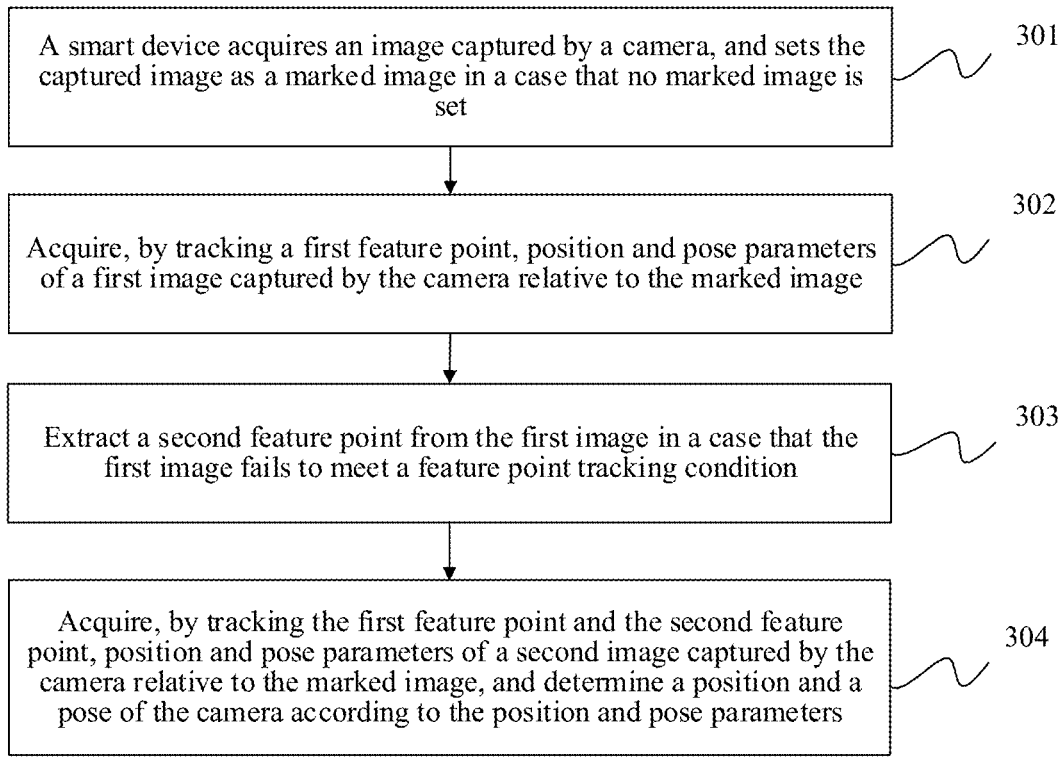
FIG. 3 is a flow chart of a position and pose determining method according to an embodiment of this application.

FIG. 3 is a flow chart of a position and pose determining method according to an embodiment of this application. The position and pose determining method is performed by a smart device. The smart device may be a terminal such as a mobile phone or a tablet computer equipped with a camera, or an AR device such as AR glasses or an AR helmet equipped with a camera. Referring to FIG. 3, the method includes the following.

301: A smart device acquires an image captured by a camera, and sets the captured image as a marked image in a case that no marked image is set.

In an embodiment of this application, in order to track changes in a position and a pose of the camera, the marked image needs to be used as a reference. During capturing of at least one image by the camera, position and pose parameters of the camera are determined by tracking a feature point of the marked image. The position and pose parameters are used for determining a position and a pose of the smart device.

Accordingly, in a case that no marked image is set, the smart device may capture an image through the camera, acquire an image currently captured by the camera, and set the image as the marked image to achieve initialization of the marked image. In a subsequent process in which the smart device continues to capture other images, position and pose parameters of each image may be acquired by tracking a feature point of the marked image.

The camera may perform photographing in a preset period. An image is captured every other preset period. The preset period may be 0.1 second or 0.01 second.

In a possible implementation, in order to prevent a few number of feature points in the marked image and causing a tracking failure, after a captured image is acquired, the feature points may be extracted from the image to determine whether the number of extracted feature points reaches a preset number. In a case that the number of feature points extracted from the image reaches the preset number, the image is set as the marked image. In a case that the number of feature points extracted from the image fails to reach the preset number, the image may not be set as the marked image, but a next image captured by the camera may be acquired until the number of the extracted feature points reaches a preset number of images, the image whose number of the extracted feature points reaches the preset number is set as the marked image.

A feature extraction algorithm used during extraction of the feature points may be a features from accelerated segment test (FAST) detection algorithm, a Shi-Tomasi corner detection algorithm, a Harris corner detection algorithms, and a scale-invariant feature transform (SIFT) algorithm, etc. The preset number may be determined according to a demand for track accuracy.

In another possible implementation, it is considered that not only a sufficient number of feature points are to be extracted, but also spatially dispersed feature points are to be extracted in order to prevent the extracted feature points from being concentrated in the same area and resulting in insufficient provided information. Accordingly, in a case that a first feature point is extracted from a marked image, the marked image is first divided into a plurality of grid areas of the same size, and a feature point is extracted from the marked image to obtain a weight of each extracted feature point. A feature point with the highest weight is extracted from each of the divided grid areas as the first feature point, and other feature points with lower weights are not considered any more, until the first feature point is extracted in all grid areas in the marked image or until a number of the first feature points extracted in the marked image reaches a preset number.

A size of each grid area may be determined according to tracking accuracy requirements and a number of to-be-extracted first feature points. A weight of the feature point is used for representing a gradient of the feature points. A greater weight of the feature point represents a greater gradient, so that the feature point is more easily tracked. Therefore, tracking of a feature point with a greater weight improves tracking accuracy. For example, for each feature point, a gradient of the feature point is acquired. The gradient is directly used as a weight of the feature point, or the gradient is adjusted according to a preset coefficient to obtain the weight of the feature point, so that the weight of the feature point is proportional to the gradient of the feature point.

Filtering of a feature point by using the grid area may ensure that only one feature point is included in one grid area, and that a plurality of feature points is not concentrated in the same area, ensuring spatial dispersion between the feature points.

After the marked image is initialized successfully, a rotation parameter and a displacement parameter, a depth of an initial feature point depth and an initial homography matrix of the marked image are set. For example, the initial feature point depth s may be set to 1, the rotation parameter matrix may be set to a unit matrix, the initial translation matrix may be set to [0, 0, s], and the initial homography matrix may be set to a unit matrix. In addition, in order to ensure the unity of an algorithm, the depth of the initial feature point is ensured to be the same as a depth of an initial camera pose.

302: Acquire, by tracking a first feature point, position and pose parameters of a first image captured by a camera relative to a marked image.

The first feature point is extracted from the marked image, and the first feature point extracted from the marked image is used as a to-be-tracked target feature point. With changes in the position or pose of the camera, the smart device captures at least one image through the camera, and tracks the first feature point in the at least one image to obtain position and pose parameters of each image relative to the marked image.

In an embodiment of this application, for example, the first feature point is tracked currently. The first feature point may include a first feature point extracted from the marked image, or may include not only a first feature point extracted from the marked image, but also a first feature point extracted from an image captured by the camera after the marked image. A specific extraction method is similar to a method for extracting a second feature point from the first image in the following steps, and the details are not described herein again.

During tracking of the first feature point, for two adjacent images capture by the camera, the first feature point extracted from a previous image is used for performing optical flow to find a matched first feature point between the previous image and a next image, and obtain optical flow information of the matched first feature point. The optical flow information is used for representing the movement information of the matched first feature point in the two adjacent images. Therefore, position and pose parameters of a second image relative to a first image in two adjacent images may be determined according to the optical flow information of the matched first feature point. An algorithm used for the optical flow may be a Lucas-Kanade optical flow algorithm or other algorithms. In addition to the optical flow, a descriptor or a direct method may be further used for matching the feature point to find the matched first feature point between the previous image and the next image.

Then, for the first image captured by the camera after the marked image, according to the position and pose parameters of each image from the marked image to the first image relative to the previous image, iteration may be performed to determine position and pose parameters of the first image relative to the marked image. The position and pose parameters of the first image relative to the marked image may include a displacement parameter and a rotation parameter. The displacement parameter is used for representing a distance between a position at which the camera captures the first image and a position at which the camera captures the marked image. The rotation parameter is used for representing an angle difference between a rotation angle at which the camera captures the first image and a rotation angle at which the camera captures the marked image. In addition, the position and pose parameters may be represented in a form of a rotation-displacement matrix. The rotation-displacement matrix is composed of a rotation parameter matrix and a displacement parameter matrix. The rotation parameter matrix includes a rotation parameter, and the displacement parameter matrix includes a displacement parameter.

For example, starting from the marked image, the camera successively captures an image 1, an image 2, and an image 3, and position and pose parameters (R1, T1) of the image 1 relative to the marked image, position and pose parameters (R2, T2) of the image 2 relative to the image 1, and position and pose parameters (R3, T3) of the image 3 relative to the image 2 are acquired. Therefore, iteration may be performed according to the position and pose parameters, and position and pose parameters (R3', T3') of the image 3 relative to the marked image are determined as the following:

$$\begin{bmatrix} R3' & T3' \\ 0 & 1 \end{bmatrix} = \begin{bmatrix} R1 & T1 \\ 0 & 1 \end{bmatrix} * \begin{bmatrix} R2 & T2 \\ 0 & 1 \end{bmatrix} * \begin{bmatrix} R3 & T3 \\ 0 & 1 \end{bmatrix}.$$

In a possible implementation, the position and pose parameters may be obtained through a homography matrix, that is, step 302 may include the following steps 3021-3022.

3021: Acquire, by tracking a first feature point, a homography matrix of a first image relative to a marked image.

The homography matrix is a matrix representing a transformation relationship between a feature point in the first image and a corresponding feature point in the marked image, the relationship being shown as follows:

$$x_c = H_{ca} * x_a;$$

$x_c$ representing homogeneous coordinates corresponding to two-dimensional coordinates of a feature point in the image c, $x_a$ representing homogeneous coordinates corresponding to two-dimensional coordinates of a relative feature point in the image a, and $H_{ca}$ representing a homography matrix of the image c relative to the image a.

Because the homogeneous coordinates corresponding to the two-dimensional coordinates of the feature point are all 3*1 vectors, the homography matrix is a 3*3 matrix represented as $$\begin{bmatrix} h00 & h01 & h02 \\ h10 & h11 & h12 \\ h20 & h21 & h22 \end{bmatrix}.$$

Therefore, during capturing by the camera, a plurality of first feature points may be tracked to obtain homogeneous coordinates that are of a plurality of first feature points and that correspond to two-dimensional coordinates in two adjacent images captured by the camera, and a homography matrix between two images may be calculated according to the acquired coordinates by using the foregoing relationship. The homography matrix includes 9 elements. One of the elements is set to have 8 unknowns after 1. Therefore, in order to obtain a unique solution of the homography matrix, homogeneous coordinates that are of at least 4 feature points and that correspond to two-dimensional coordinates in the two adjacent images are acquired.

For the marked image and the first image, the first feature point is tracked from each image from a next image of the marked image to the first image to acquire a homography matrix of each image relative to a previous image. Iteration is performed on the homography matrix of each image relative to the previous image to obtain a homography matrix of the first image relative to the marked image.

3022: Decompose, according to a preset constraint condition that the rotation-displacement matrix is to meet, the homography matrix to obtain a rotation-displacement matrix of the first image relative to the marked image, and acquire position and pose parameters of the first image relative to the marked image from the rotation-displacement matrix.

In a possible implementation, step 3022 includes the following.

(1) Translate an image coordinate system of the marked image toward a negative direction of a z axis by one unit to form a first coordinate system, and decompose a homography matrix according to a preset constraint condition that a rotation-displacement matrix is to meet to obtain the rotation-displacement matrix of the first image relative to a marked image in the first coordinate system.

The rotation-displacement matrix includes a rotation parameter matrix and a displacement parameter matrix of the first image relative to the marked image in the first coordinate system. An element in the rotation parameter matrix is a rotation parameter of the first image relative to the marked image in the first coordinate system, and an element in the displacement parameter matrix is a displacement parameter of the first image relative to the marked image in the first coordinate system. The preset constraint condition is that a column vector of a rotation parameter matrix in the rotation-displacement matrix is a unit matrix, and a product of a first column and a second column of the rotation-parameter matrix is equal to a third column.

In a possible implementation, a feature point in the first image and a corresponding feature point in the marked image further have the following transformation relationship:

$$x_c = g * P * [Rcm/Tcm] * \begin{bmatrix} 1 & 0 & 0 & 0 \\ 0 & 1 & 0 & 0 \\ 0 & 0 & 1 & -1 \\ 0 & 0 & 0 & 1 \end{bmatrix} * \begin{bmatrix} 1 & 0 & 0 \\ 0 & 1 & 0 \\ 0 & 0 & 1 \\ 0 & 0 & 1 \end{bmatrix} * P^{-1} * x_a;$$

$$[Rcm/Tcm] = \begin{bmatrix} R00 & R01 & R02 & T0 \\ R10 & R11 & R12 & T1 \\ R20 & R21 & R22 & T2 \end{bmatrix};$$

Rcm representing the rotation parameter matrix of the first image relative to the marked image in the first coordinate system, Tcm representing the displacement parameter matrix of the first image relative to the marked image in the first coordinate system, g representing a normalization factor, and P representing a perspective projection parameter of the camera; and $$\begin{bmatrix} 1 & 0 & 0 \\ 0 & 1 & 0 \\ 0 & 0 & 1 \\ 0 & 0 & 1 \end{bmatrix}$$

being used for aligning a nonhomogeneous item, and $$\begin{bmatrix} 1 & 0 & 0 & 0 \\ 0 & 1 & 0 & 0 \\ 0 & 0 & 1 & -1 \\ 0 & 0 & 0 & 1 \end{bmatrix}$$

being used for transforming an image coordinate system of the marked image into the first coordinate system.

Therefore, it may be determined that $$\begin{bmatrix} h00 & h01 & h02 \\ h10 & h11 & h12 \\ h20 & h21 & h22 \end{bmatrix} = g*P*\begin{bmatrix} R00 & R01 & R02 & T0 \\ R10 & R11 & R12 & T1 \\ R20 & R21 & R22 & T2 \end{bmatrix}*P^{-1}.$$

In addition, because coordinates in the z axis of feature points in the first coordinate system are all 0, a third column in the rotation-displacement matrix is 0, and the following may be determined by deleting the third column:

$$\begin{bmatrix} h00 & h01 & h02 \\ h10 & h11 & h12 \\ h20 & h21 & h22 \end{bmatrix} = g*P*\begin{bmatrix} R00 & R01 & T0 \\ R10 & R11 & T1 \\ R20 & R21 & T2 \end{bmatrix}*P^{-1}.$$

In the formula, the homography matrix is known, P is known, the normalization factor g may be calculated according to a condition that the column vector of the rotation parameter matrix is a unit matrix, and a first column and a second column of the rotation parameter matrix are further determined, the third column is determined after multiplying the first column by the second column, so that the rotation parameter matrix Rcm is further calculated, and the displacement parameter matrix Tcm may be calculated according to the normalization factor g and the third column of the homography matrix.

In addition, for a positive or negative characteristic of the displacement parameter matrix Tcm, a position of the marked image in the camera may be calculated. Because the marked image is certainly located in front of the camera, a product of a displacement parameter of the marked image and an ordinate of the marked image in the camera coordinate system is less than 0. According to this constraint condition, the positive or negative characteristic of the displacement parameter matrix Tcm may be determined.

(2) Transform the rotation-displacement matrix of the first image relative to the marked image in the first coordinate system according to a transformation relationship between the first coordinate system and the image coordinate system of the marked image to obtain a rotation-displacement matrix of the first image relative to the marked image.

In other words, transformation is performed by using the following formula to obtain the rotation-displacement matrix of the first image relative to the marked image:

$$\begin{bmatrix} Rca & Tca \\ 0 & 1 \end{bmatrix} = \begin{bmatrix} Rcm & Tcm \\ 0 & 1 \end{bmatrix} * \begin{bmatrix} 1 & 0 & 0 & 0 \\ 0 & 1 & 0 & 0 \\ 0 & 0 & 1 & -1 \\ 0 & 0 & 0 & 1 \end{bmatrix};$$

Rca representing a rotation parameter matrix of the first image relative to the marked image, and Tca representing a displacement parameter matrix of the first image relative to the marked image.

After the rotation-displacement matrix is calculated, the rotation parameter and the displacement parameter of the first image relative to the marked image may be determined according to the rotation-displacement matrix.

Figure 4:
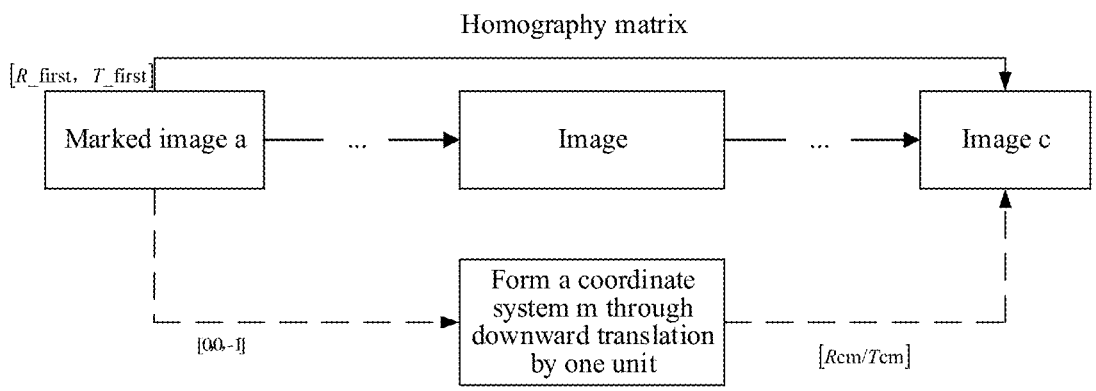
FIG. 4 is a schematic diagram of an image according to an embodiment of this application.

For example, a plurality of images captured by the camera is shown in FIG. 4. A tracking process includes steps below:

1. The camera captures a marked image a;
2. The camera captures a plurality of images and tracks a first feature point of a marked image a until the camera captures an image c;
3. Translate a feature point of the marked image a by one unit toward a negative direction of a z axis to form a coordinate system m, and decompose a homography matrix of the image c relative to the image a to obtain a rotation-displacement matrix [Rcm/Tcm] of the image c relative to the marked image a in the coordinate system m; and
4. Transform the rotation-displacement matrix of the image c relative to the marked image a in the coordinate system m according to a transformation relationship between the coordinate system m and the marked image a, to obtain a rotation-displacement matrix [Rca/Tca] of the image c relative to the marked image a.

After step 302, position and pose parameters of the first image may also be obtained according to position and pose parameters of the first image relative to the marked image and position and pose parameters of the marked image.

Based on steps 3021-3022, in a possible implementation, after the rotation-displacement matrix of the first image relative to the marked image, the rotation-displacement matrix of the first image is acquired according to the rotation-displacement matrix of the first image relative to the marked image and the rotation-displacement matrix of the marked image by using the following formula:

$$\begin{bmatrix} R\_final & T\_final \\ 0 & 1 \end{bmatrix} = \begin{bmatrix} Rca & s*Tca \\ 0 & 1 \end{bmatrix} * \begin{bmatrix} R\_first & T\_first \\ 0 & 1 \end{bmatrix};$$

s representing a depth of the first image; R_final representing a rotation parameter matrix of the first image, and T_final representing a displacement parameter matrix of the first image; Rca representing a rotation parameter matrix of the first image relative to the marked image, and Tca representing a displacement parameter matrix of the first image relative to the marked image; and R_first representing a rotation parameter matrix of the marked image, and T_first representing a displacement parameter matrix of the marked image.

303: Extract a second feature point from the first image in a case that the first image fails to meet a feature point tracking condition, the second feature point being different from the first feature point.

During tracking of the feature point, with the changes in the position and the pose of the camera, a number of first feature points included in a captured image may be gradually reduced, resulting in that some first feature points in a previous image do not have matched first feature points in a next image. In a case that first feature points included in two adjacent images are matched, some mismatched first feature points are excluded.

In addition, detection may be performed according to a calculation result of a homography matrix and a result of optical flow matching to exclude an irrational first feature point. In other words, for each first feature point, according to a homography matrix of an image relative to the marked image during extraction of the first feature point and a homography matrix of the first image relative to the marked image, a homography matrix between the first image and the image during extraction of the first feature point may be calculated. Iteration is performed according to optical flow information of the first feature point between any two adjacent images of the foregoing two images to obtain optical flow information of the first feature point between the two images. The homography matrix is compared with the optical flow information. In a case that there is a great difference between the homography matrix and the optical flow information, it means that the movement of the first feature point does not meet a due rotation and translation relationship, and a great error is caused. Therefore, the first feature point is deleted in order to prevent an impact on a subsequent tracking process.

Tracking failure is possibly caused in a case that there are fewer first feature points. Therefore, after the camera captures the first image, it is determined whether the first image meets a feature point tracking condition.

In a possible implementation, the feature point tracking condition may be that a number of tracked feature points reach a preset number. In a case that a number of tracked feature points in an image reaches the preset number, it is determined that the image meets the feature point tracking condition, otherwise, it is determined that the image does not meet the feature point tracking condition.

Correspondingly, for a first image, a number of tracked feature points in the first image are acquired. In a case that the number reaches a preset number, it is determined that the first image meets the feature point tracking condition. In a case that the number fails to reach the preset number, it is determined that the first image fails to meet the feature point tracking condition.

In a case that it is determined that the first image fails to meet the feature point tracking condition, a second feature point different from the first feature point is extracted from the first image, and the first feature point tracked in the first image and a newly extracted second feature point are both used as to-be-tracked target feature points, and tracking is continued, thereby increasing a number of feature points.

In a possible implementation, in order to prevent a small number of feature points extracted from the first image from causing a tracking failure, a second feature point is extracted from the first image. It is determined whether a sum of a number of extracted second feature points and a number of first feature points tracked in the first image reaches a preset number. In a case that the sum of the number of second feature points extracted from the first image and the number of the first feature points tracked in the first image reaches the preset number, extraction of the feature point is completed.

A feature extraction algorithm used for extraction of the feature point may be an FAST detection algorithm, a Shi-Tomasi corner detection algorithm, a Harris corner detection algorithm, and an SIFT algorithm, etc. The preset number may be determined according to the demand for tracking accuracy.

A number of feature points may be increased through addition of a new feature point to ensure a smooth progress of a tracking process, preventing a decrease in the number of feature points from causing a tracking failure, and improving tracking accuracy.

Figure 5:
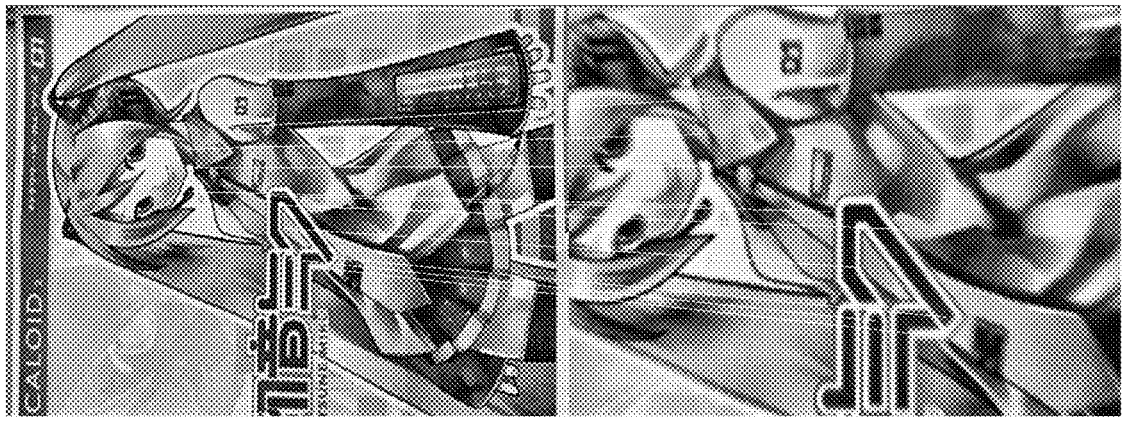
FIG. 5 is a schematic distribution diagram of a feature point according to an embodiment of this application.

In addition, with changes in a position or a pose of the camera, even if the first feature points may be tracked in the first image, the first feature points may also be concentrated at one area and distributed very intensively, so that insufficient information is provided, or the first feature points may be distributed very dispersedly, so that provided information is not accurate enough. In this case, the first feature points do not have representativeness of a current image, and position and pose parameters of the first feature points cannot accurately reflect position and pose parameters of the current image, causing a great calculation error. For example, referring to FIG. 5, a left picture is a first feature point in an initial marked image, and a right picture is a first image. As a camera is moved, the marked image becomes the first image after being enlarged, resulting in the first feature points being too dispersed in the first image, so that the first image cannot be described accurately. In a case that the position and pose parameters of the first image are acquired according to the excessively dispersed first feature points, the position and pose parameters are not accurate enough.

It is considered that not only a sufficient number of feature points are to be extracted, but also spatially dispersed feature points are to be extracted in order to prevent the extracted feature points from being concentrated in the same area. Accordingly, during extraction of a second feature point from the first image, the first image is first divided into a plurality of grid areas of the same size, a feature point is extracted from the first image, and a weight of each extracted feature point is acquired. A feature point with the highest weight is extracted, as a second feature point, in each divided grid area including no first feature point. Other feature points with a lower weight are not considered any more, until a feature point (the first feature point or the second feature point) is extracted from all grid areas in the first image, or until a sum of a number of the second feature points extracted from the first image and a number of first feature points tracked in the first image reaches a preset number.

In another possible implementation, in a case that the second feature point is extracted from the first image, the first image is first divided into a plurality of grid areas of the same size, and a weight of the first feature point extracted before tracking in the first image is acquired. According to the acquired weight, one first feature point with the highest weight is extracted in each divided grid area, and a first feature point with a lower weight is not extracted any longer, so that a first feature point with a lower weight is removed from a plurality of first feature points that are distributed in a concentrated manner. Afterwards, a feature point is extracted from the first image, and a weight of each extracted feature point is acquired. A feature point with the highest weight is extracted, as a second feature point, from each grid area including no first feature point, and other feature points with a lower weight are not considered any more, until the feature point (the first feature point or the second feature point) is extracted from all grid areas in the first image, or until the sum of the number of second feature points extracted from the first image and a number of remaining first feature points in the first image reaches a preset number.

A size of each grid area may be determined according to tracking accuracy requirements and a number of to-be-extracted feature points. A weight of the feature point is used for representing a gradient of the feature points. A greater weight of the feature point represents a greater gradient, so that the feature point is more easily tracked. Therefore, tracking of a feature point with a greater weight may improve tracking accuracy. For example, for each feature point, a gradient of the feature point is acquired. The gradient is directly used as a weight of the feature point, or the gradient is adjusted according to a preset coefficient to obtain the weight of the feature point, so that the weight of the feature point is proportional to the gradient of the feature point.

Filtering of a feature point by using the grid area may ensure that only one feature point is included in one grid area, and that a plurality of feature points is not concentrated in the same area, ensuring spatial dispersion between the feature points.

In addition, for a newly extracted second feature point in the first image, a homography matrix of the first image is recorded, so that it is detected, according to the homography matrix of an image during extraction of the second feature point relative to a marked image and an optical flow matching result, whether a movement of the second feature point is irrational, thereby determining whether the second feature point is to be deleted.

304: Acquire, by tracking the first feature point and the second feature point, position and pose parameters of a second image captured by the camera relative to the marked image, and determine a position and a pose of the camera according to the position and pose parameters, the second image being an image captured by the camera after the first image.

After the second feature point is increased, the first feature point and the second feature point are continually tracked in an image captured by the image.

For example, for the second image, iteration may be performed according to position and pose parameters of each image from the marked image to the second image relative to a previous image, so as to determine position and pose parameters of the second image relative to the marked image. A position and a pose of the camera during capturing of the second image and changes in the position and pose of the camera during capturing of the marked image are determined according to the position and pose parameters of the second image relative to the marked image. The position and pose parameters of the second image relative to the marked image may include at least one of a displacement parameter and a rotation parameter. The displacement parameter is used for representing a distance between a position at which the camera captures the second image and a position at which the camera captures the marked image. The rotation parameter is used for representing an angle difference between a rotation angle at which the camera captures the second image and a rotation angle at which the camera captures the marked image. In addition, the position and pose parameters may be represented in a form of a rotation-displacement matrix. The rotation-displacement matrix is composed of a rotation parameter matrix and a displacement parameter matrix. The rotation parameter matrix includes a rotation parameter, and the displacement parameter matrix includes a displacement parameter.

In a possible implementation, the position and pose parameters may be obtained through a homography matrix, that is, step 304 may include the following steps 3041-3042.

3041: Acquire, by tracking the first feature point and the second feature point, a homography matrix of the second image relative to the marked image.

For the marked image and the second image, the first feature point and the second feature point may be tracked in each image from a next image of the marked image to the second image to acquire a homography matrix of each image relative to a previous image. Iteration is performed on the homography matrix of each image relative to the previous image to obtain the homography matrix of the second image relative to the marked image.

3042: Decompose, according to a preset constraint condition that the rotation-displacement matrix is to meet, the homography matrix to obtain a rotation-displacement matrix of the second image relative to the marked image, and acquire position and pose parameters of the second image relative to the marked image from the rotation-displacement matrix.

In a possible implementation, step 3042 includes the following:

(1) An image coordinate system of the second image is translated by one unit toward a negative direction of a z axis to form a second coordinate system, and the homography matrix is decomposed according to a preset constraint condition that the rotation-displacement matrix is to meet, to obtain the rotation-displacement matrix of the second image in the second coordinate system relative to the marked image; and (2) the rotation-displacement matrix of the second image in the second coordinate system relative to the marked image is transformed according to a transformation relationship between the second coordinate system and the image coordinate system of the second image, to obtain the rotation-displacement matrix of the second image relative to the marked image.

Specific processes of steps 3041-3042 are similar to processes of steps 3021-3022, and the details are not described herein again.

After the rotation-displacement matrix is calculated, the rotation parameter and the displacement parameter of the second image relative to the marked image may be determined according to the rotation-displacement matrix.

After step 304, the position and pose parameters of the second image may also be obtained based on the position and pose parameters of the second image relative to the marked image and the position and pose parameters of the marked image. A specific process is similar to a process of acquisition of the position and pose parameters of the first image, and the details are not described herein again. In addition, after the position and pose parameters of the second image are acquired, a filter may be configured to smooth the obtained position and pose parameters and then output the smoothed position and pose parameters, preventing a jitter result. The filter may be a Kalman filter or other filters.

One marked image is only illustrated in the embodiment of this application. In another embodiment, a feature point may be added during tracking, and the marked image may be further replaced. In a case that a current image fails to meet a feature point tracking condition, a previous image of the current image is used as new marked image after replacement, and tracking is continued based on the new marked image. Through replacement of the marked image, a tracking failure may be prevented due to excessive changes in the position or pose of the camera.

In the method according to the embodiment of this application, during acquisition, by tracking the first feature point, of position and pose parameters of an image captured by the camera relative to a marked image, in a case that the first image fails to meet a feature point tracking condition, a second feature point is extracted from the first image, the position and pose parameters of the image captured by the camera relative to the marked image are acquired by tracking the first feature point and the second feature point, so that the position and pose of the camera are determined, preventing a failure of tracking a feature point due to excessive changes in the position or pose of the camera, increasing robustness, and improving tracking accuracy of the camera. The method according to the embodiment of this application is lightweight and simple without complex back-end optimization, achieving a very fast calculation speed and even achieving real-time tracking. Compared with a traditional simultaneous localization and mapping (slam) algorithm, the method according to the embodiment of this application is more robust and may achieve very high calculation accuracy.

In addition, no marked image is needed to be preset, and a current scene is only needed to be captured to obtain one image that is determined as the initial marked image, so that the marked image may be initialized, getting rid of a limitation of presetting of the marked image and expanding an application scope.

In addition, the grid areas are used for filtering feature points to ensure that only one feature point is included in one grid area and a plurality of feature points are not concentrated in the same area, ensuring spatial dispersion between feature points, thereby improving the tracking accuracy.

In addition, the homography matrix is decomposed to obtain the position and pose parameters, preventing a complex tracking algorithm, causing a more stable and smooth result without jitter, which is especially applicable to an AR scene.

In an embodiment of this application, the position and pose parameters may include a displacement parameter and a rotation parameter. The displacement parameter is used for representing a displacement of the camera to determine a change in a position of the camera in a three-dimensional space. The rotation parameter is used for representing a change in a rotation angle of the camera to determine a change in the pose of the camera in the three-dimensional space. The displacement parameter and rotation parameter of the camera may be acquired by performing the foregoing steps. Alternatively, the displacement parameter other than the rotation parameter of the camera may be acquired by performing the foregoing steps. Acquisition of the rotation parameter of the camera is shown in detail in an embodiment below.

Figure 6:
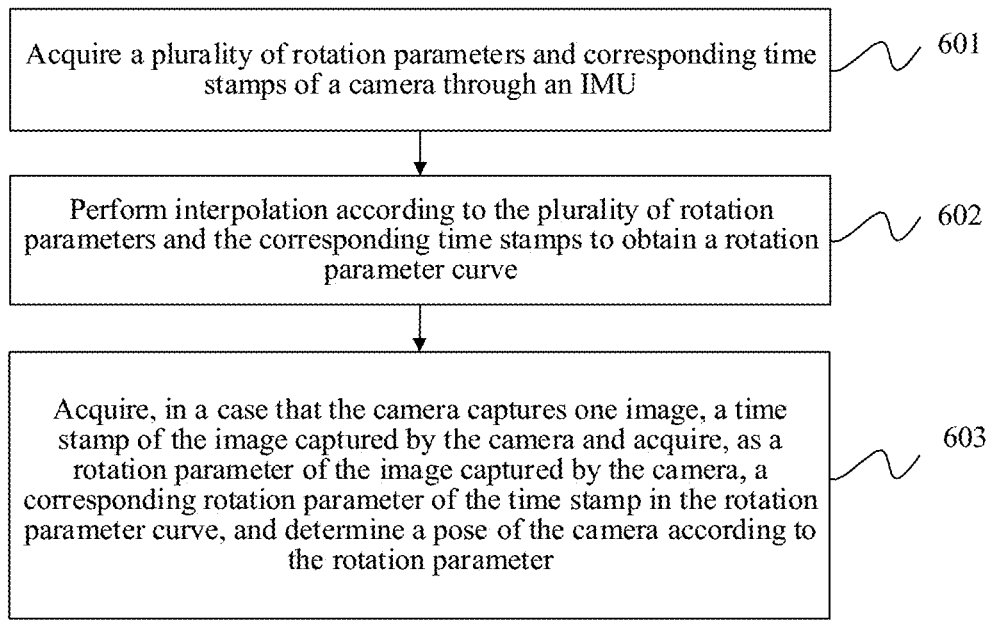
FIG. 6 is a flow chart of a position and pose determining method according to an embodiment of this application.

FIG. 6 is a flow chart of a position and pose determining method according to an embodiment of this application. The position and pose determining method is performed by a smart device. The smart device may be a terminal such as a mobile phone or a tablet computer equipped with a camera, or an AR device such as AR glasses or an AR helmet equipped with a camera. Referring to FIG. 6, the method includes the following.

601: Acquire a plurality of rotation parameters and corresponding time stamps of a camera through an inertial measurement unit (IMU).

A time stamp corresponding to each rotation parameter refers to a time stamp for acquiring the rotation parameter.

602: Perform interpolation according to the plurality of rotation parameters and the corresponding time stamps to obtain a rotation parameter curve.

An interpolation algorithm may be a spherical linear interpolation (Slerp) algorithm or other algorithms.

Interpolation is performed according to the plurality of rotation parameters and the corresponding time stamps to obtain the rotation parameter curve. The rotation parameter curve may represent a change rule of a rotation parameter of the camera as photographing time goes by.

603: Acquire, in a case that the camera captures one image, a time stamp of the image captured by the camera and acquire, as a rotation parameter of the image captured by the camera, a corresponding rotation parameter of the time stamp in the rotation parameter curve, and determine a pose of the camera according to the rotation parameter.

Because a photographing frequency of an image does not match a sampling frequency of the IMU, the rotation parameter curve is obtained by interpolation, and data alignment may be performed according to the rotation parameter curve, thereby obtaining the rotation parameter corresponding to the image, and determining the pose of the camera according to the rotation parameter.

In a practical application, a gyroscope, an accelerometer, and a geomagnetic sensor are configured for the smart device. A sole rotation parameter in an earth coordinate system may be obtained through the gyroscope and the geomagnetic sensor. The earth coordinate system has characteristics below:

1. An X axis is defined by a vector product, tangent to the ground at a current position of the smart device, and points east;
2. A Y axis is tangent to the ground at the current position of the smart device and points to the North Pole of the geomagnetic field; and
3. A Z axis points to the sky and is perpendicular to the ground.

The rotation parameter obtained through the earth coordinate system may be considered to be error-free without depending on a parameter of the IMU, preventing a calibration problem of the IMU and being compatible with various types of devices.

The smart device provides an interface to acquire the rotation parameter: a rotation-vector interface. The rotation-vector interface may be invoked according to a sampling frequency of the IMU to acquire the rotation parameter.

The smart device may store the obtained plurality of rotation parameters and the corresponding time stamps to an IMU queue, and obtain the rotation parameter curve by reading data in the IMU queue and performing interpolation. Alternatively, considering that there may be noise in the data, in order to ensure accuracy of the data, an angle difference between an obtained rotation parameter and a previous rotation parameter may be calculated. If the angle difference is greater than a preset threshold, the obtained rotation may be considered to be a noise item, and the rotation parameter is deleted. The noise item may be deleted through the foregoing detection. A rotation parameter passing the detection and a corresponding time stamp thereof are only stored to the IMU queue.

In the method according to the embodiment of this application, interpolation is performed according to the plurality of rotation parameters measured based on IMU and the corresponding time stamps to obtain the rotation parameter curve, the data alignment may be performed according to the rotation parameter curve, and the rotation parameter of the image is acquired according to the time stamp and the rotation parameter curve of the captured image without depending on the parameter of the IMU, improving accuracy and preventing IMU calibration. In addition, due to a low calculating capability of the smart device, a calculation amount may be reduced by acquiring the rotation parameter through the IMU, thereby improving a calculation speed. What's more, the noise item is deleted to improve data accuracy, further improving precision.

Figure 7:
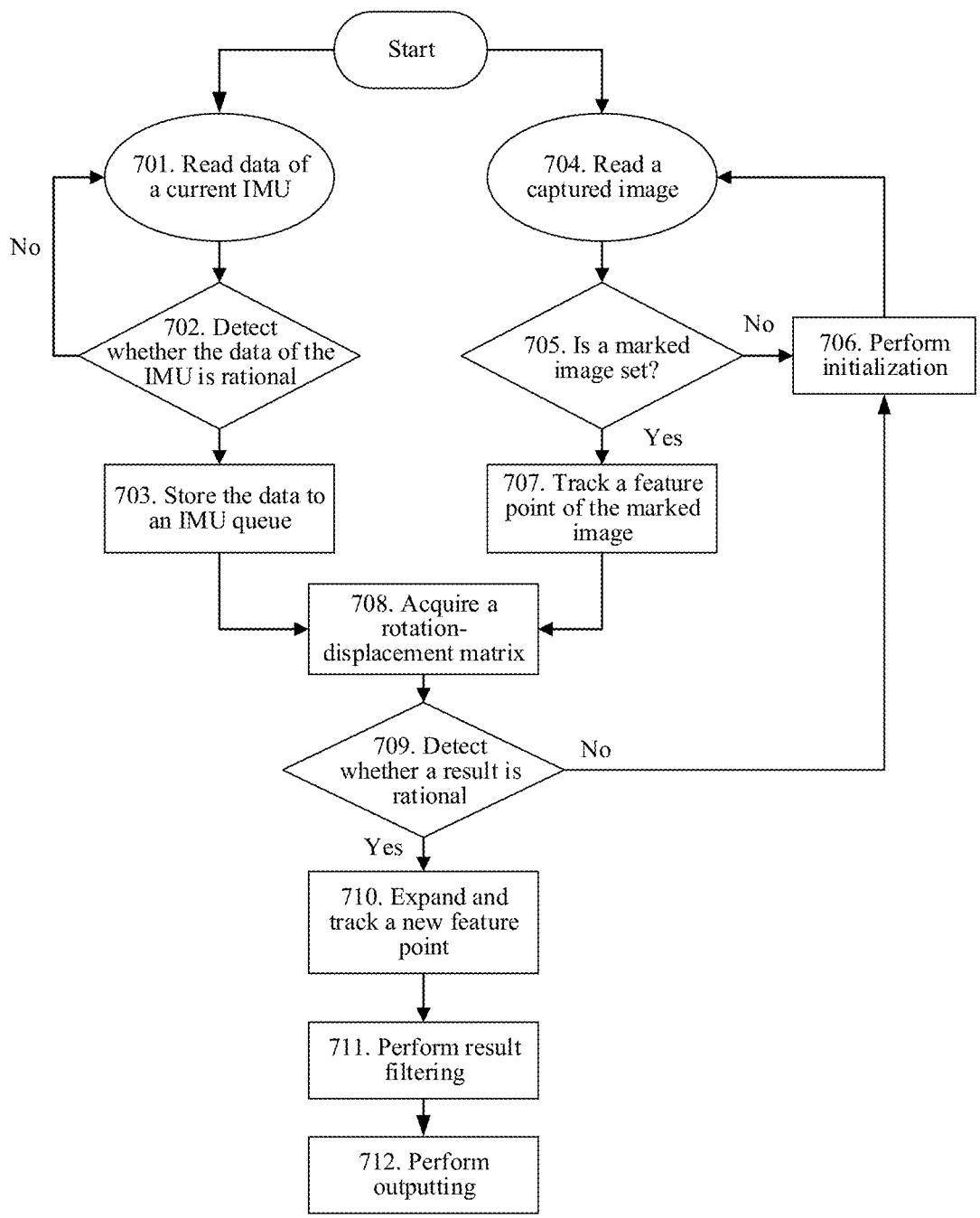
FIG. 7 is a schematic diagram of an operation process according to an embodiment of this application.

An operation process according to an embodiment of this application may be shown in FIG. 7. Referring to FIG. 7, functions of a smart device are divided into a plurality of modules. The operation process is shown below:

1. read data measured by an IMU through a module 701, the data including a rotation parameter and a corresponding time stamp; detecting whether the data is rational through a module 702; if not, discard the data, and if yes, store the data to an IMU queue through a module 703;

2. read a captured image through a module 704 and determine, through a module 705, whether a marked image is set currently. Initialize, in a case that no marked image is set, one marked image through the module 706 by using the currently captured image; and directly establish a connection with the marked image through a module 707, and track a feature point of the marked image in a case that the marked image is set;

3. acquire, through a module 708 in combination with data in the IMU queue and data obtained by tracking a feature point, a displacement parameter and a rotation parameter, and calculate a rotation-displacement matrix from a current image relative to a currently marked image;

4. detect, through a module 709, whether the rotation parameter and the displacement parameter of the image are rational, if yes, transmit a detection result into a module 710, expand a new feature point from a current image through the module 710, and calculate, by tracking the feature point, a rotation-displacement matrix of an image captured by the camera relative to the marked image. If no, return to the module 706, and reinitialize by using the current image; and 5. smooth and output data results obtained through the module 711 and the module 712. A Kalman filter or other filters may be used during smoothing.

Based on the foregoing, the embodiment of this application provides a set of camera position and pose tracking algorithms. A movement process of the camera is used as a tracking process of the feature point of the marked image. Connection is kept by addition of a new feature point during tracking. In view of a low computing capability of the smart device, a rotation parameter of the camera relative to an initial scene is obtained by using the IMU. An image of a real scene is used as the marked image, and position and pose parameters of the camera relative to the marked image are obtained through tracking and matching, to obtain changes in a position and pose of the camera relative to the initial scene, so that a set of stable, rapid, and robust camera pose tracking system in a real and natural scene is implemented without depending on a pre-specified marked image, increasing a computing speed, improving system robustness, and achieving very high camera positioning precision. In addition, a complex IMU and image fusion algorithm are prevented, and parameter sensitivity is also reduced. The method according to the embodiment of this application may be smoothly performed at a mobile terminal without accurate calibration.

The embodiment of this application corresponds to a scene in which the human eye observes a three-dimensional space. A rotation parameter has a great influence, and it is assumed that a displacement on the plane is not great. In an AR scene, because a user usually interacts with a virtual element in a plane scene, such as a coffee table, etc., it may be considered that the camera is moved on the plane, and the rotation parameter has a great impact. Therefore, the embodiment of this application is extremely applicable to an AR scene.

In addition, compared with a solution of switch of the marked image, the marked image is unnecessarily frequently switched in the embodiment of this application, but the feature point is added in real time to prevent a tracking failure, preventing an error brought by the switch of the marked image, and ensuring a smoother and more precise data result.

Figure 8:
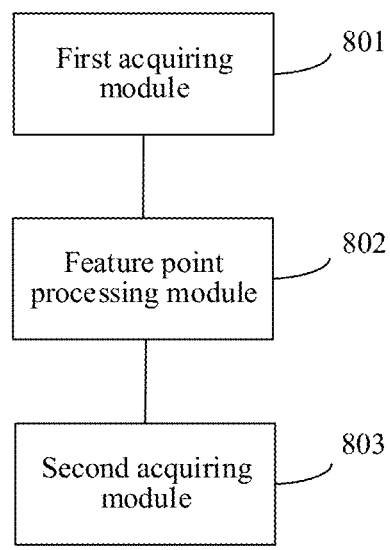
FIG. 8 is a schematic structural diagram of a position and pose determining apparatus according to an embodiment of this application.

FIG. 8 is a schematic structural diagram of a position and pose determining apparatus according to an embodiment of this application. Referring to FIG. 8, the apparatus is applied to a smart device and includes:

a first acquiring module 801 configured to perform the step in the foregoing embodiment of acquiring, by tracking a first feature point, position and pose parameters of a first image relative to a marked image;

a feature point processing module 802 configured to perform the step in the foregoing embodiment of extracting a second feature point from the first image in a case that the first image fails to meet the feature point tracking condition; and a second acquiring module 803 configured to perform the step in the foregoing embodiment of acquiring position and pose parameters of the second image relative to the marked image by tracking the first feature point and the second feature point, and determining the position and pose according to the position and pose parameters.

Optionally, the apparatus further includes:

an area dividing module configured to perform the step in the foregoing embodiment of dividing the marked image into a plurality of grid areas of the same size;

a weight acquiring module configured to perform the step in the foregoing embodiment of acquiring a weight of each feature point extracted from the marked image; and an extracting module configured to perform the step in the foregoing embodiment of extracting a feature point with the highest weight in each divided grid area.

Optionally, the apparatus further includes:

a number acquiring module configured to perform the step in the foregoing embodiment of acquiring a number of the first feature points tracked in the first image; and a determining module configured to perform the step in the foregoing embodiment of determining, in a case that the number fails to reach a preset number, that the first image fails to meet the feature point tracking condition.

Optionally, the feature point processing module 802 is configured to perform the step in the foregoing embodiment of dividing the first image into a plurality of grid areas of the same size, acquiring a weight of each feature point extracted from the first image, and extracting a feature point in a grid area including no first feature point.

Optionally, the first acquiring module 801 is configured to perform the step in the foregoing embodiment of obtaining the rotation-displacement matrix of the first image relative to the marked image by acquiring and decomposing a homography matrix of the first image relative to the marked image, and acquiring the position and pose parameters of the first image relative to the marked image from the rotation-displacement matrix.

Optionally, the first acquiring module 801 is configured to perform the step in the foregoing embodiment of iteratively processing the homography matrix of each image relative to a previous image to obtain the homography matrix of the first image relative to the marked image.

Optionally, the first acquiring module 801 is configured to perform the step in the foregoing embodiment of decomposing the homography matrix to obtain a rotation-displacement matrix of the first image relative to the marked image in the first coordinate system, and the step of transforming the rotation-displacement matrix of the first image relative to the marked image in the first coordinate system to obtain the rotation-displacement matrix of the first image relative to the marked image.

Optionally, the apparatus further includes:

an initializing module configured to perform the step in the foregoing embodiment of determining a captured image as a marked image.

Optionally, the position and pose parameters include a displacement parameter, and the apparatus further includes:

an interpolation processing module configured to acquire a plurality of rotation parameters and corresponding time stamps of the camera through an inertial measurement unit (IMU), and perform interpolation according to the plurality of rotation parameters and the corresponding time stamps to obtain a rotation parameter curve; and a rotation parameter acquiring module configured to acquire, as a rotation parameter of the first image, a corresponding rotation parameter of a time stamp of the first image in the rotation parameter curve.

For the position and pose determining apparatus in the foregoing embodiments, division of the functional modules is only illustrated during determination of the position and pose. In a practical application, the functions are completed by different functional modules as required. In other words, an internal structure of the smart device is divided into different functional modules to complete all or a part of the described functions. In addition, the position and pose determining apparatus and position and pose determining method embodiments in the foregoing embodiments are designed with a same idea, and a specific implementation thereof is shown in the method embodiments, and the details thereof are not described herein again.

Figure 9:
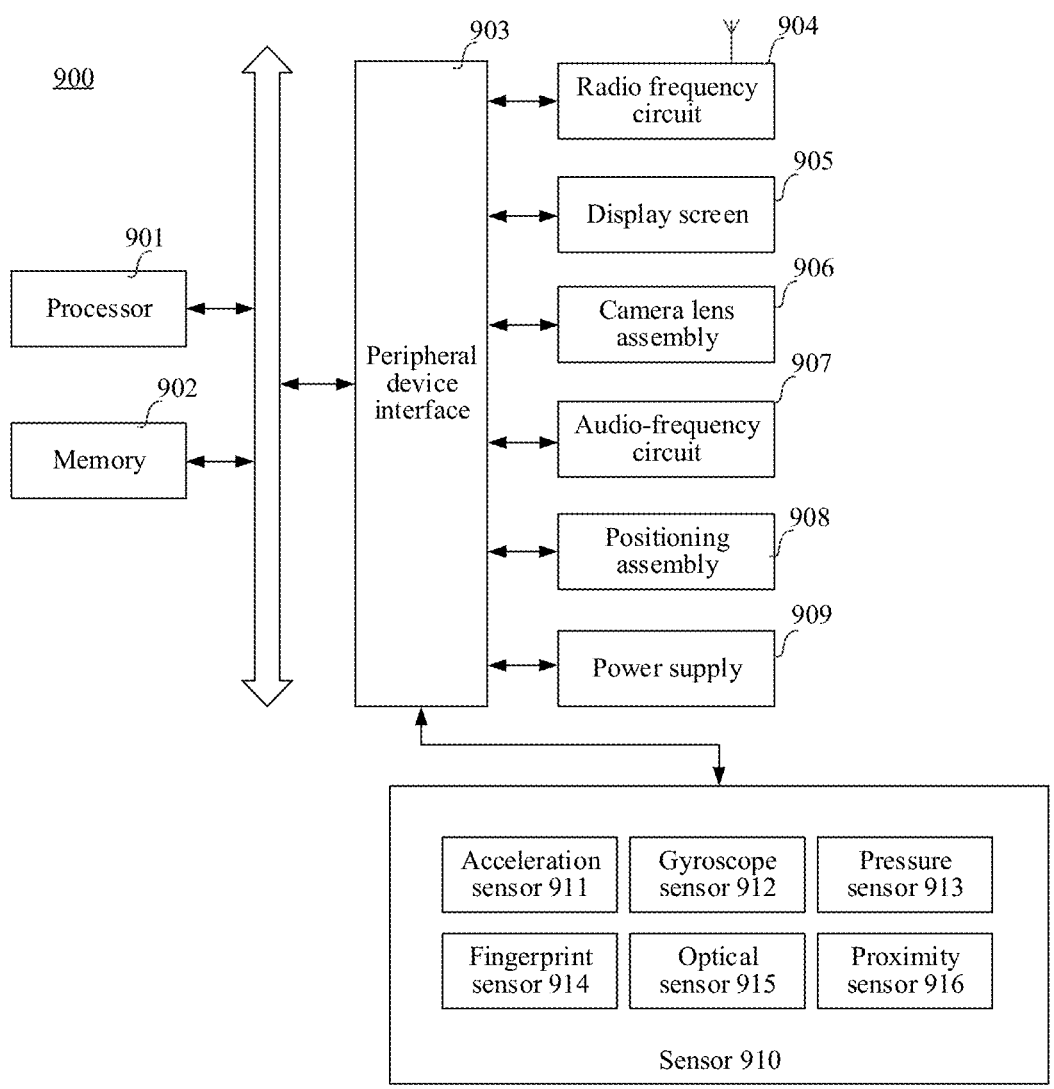
FIG. 9 is a schematic structural diagram of a terminal according to an embodiment of this application.

FIG. 9 shows a structural block diagram of a terminal 900 according to an exemplary embodiment of this application. The terminal 900 is used to perform the steps performed by the smart device in the foregoing method embodiments.

The terminal 900 may be a portable mobile terminal such as a smartphone, a tablet computer, a moving picture experts group audio layer III (MP3) player, a moving picture experts group audio layer IV (MP4) player, a notebook computer, or a desktop computer, or may be an AR device such as AR glasses or an AR helmet. The terminal 800 may also be referred to as another name such as user equipment, portable terminal, laptop terminal, and desktop terminal.

The terminal includes a processor 901 and a memory 902. The memory 902 stores at least one instruction, at least one program, and a code set or an instruction set. The instruction, the program, and the code set or the instruction set are loaded and executed by the processor 901 to implement the operations performed by the smart device in the foregoing embodiments.

The processor 901 may include one or more processing cores, for example, a 4-core processor or a 5-core processor. The processor 901 may be implemented by at least one hardware form of a digital signal processor (DSP), a field-programmable gate array (FPGA), and a programmable logic array (PLA). The processor 901 may alternatively include a main processor and a coprocessor. The main processor is configured to process data in an awake state, also referred to as a central processing unit (CPU), and the coprocessor is a low-power processor configured to process data in an idle state. In some embodiments, the processor 901 may be integrated with a graphics processing unit (GPU). The GPU is responsible for rendering and drawing content to be displayed by a display screen. In some embodiments, the processor 901 may further include an artificial intelligence (AI) processor. The AI processor is configured to process a calculation operation related to machine learning.

The memory 902 may include one or more computer-readable storage media. The computer-readable storage media may be non-transient. The memory 902 may further include a high-speed random access memory, and a non-volatile memory such as one or more magnetic disk storage devices and a flash memory device. In some embodiments, the non-transient computer-readable storage medium in the memory 902 is configured to store at least one instruction. The at least one instruction is executed by the processor 901 to perform the position and pose determining method provided in the method embodiment of this application.

In some embodiments, the terminal 900 may further optionally include a peripheral device interface 903 and at least one peripheral device. The processor 901, the memory 902, and the peripheral device interface 903 may be connected through a bus or a signal cable. Each peripheral device may be connected to the peripheral device interface 903 through a bus, a signal cable, or a circuit board. Specifically, the peripheral device includes: at least one of a radio frequency (RF) circuit 904, a touch display screen 905, a camera component 906, an audio frequency circuit 907, a positioning component 909, and a power supply 909.

The peripheral device interface 903 may be configured to connect at least one peripheral device related to input/output (I/O) to the processor 901 and the memory 902. In some embodiments, the processor 901, the memory 902, and the peripheral device interface 903 are integrated into the same chip or circuit board. In some other embodiments, any one or two of the processor 901, the memory 902, and the peripheral device interface 903 may be implemented on an independent chip or circuit board, and the implementation is not limited in this embodiment.

The radio frequency circuit 904 is configured to receive and transmit a radio frequency (RF) signal, also referred to as an electromagnetic signal. The radio frequency circuit 904 communicates with a communications network and another communications device by using the electromagnetic signal. The radio frequency circuit 904 may convert an electric signal into an electromagnetic signal for transmission, or convert a received electromagnetic signal into an electric signal. Optionally, the radio frequency circuit 904 includes an antenna system, an RF transceiver, one or more amplifiers, a tuner, an oscillator, a digital signal processor, a codec chip set, a subscriber identity module card, and the like. The radio frequency circuit 904 may communicate with another terminal by using a wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the radio frequency circuit 904 may further include a near field communication (NFC) related circuit, and is not limited in this application.

The display screen 905 is configured to display a user interface (UI). The UI may include a graph, text, an icon, a video, and any combination thereof. In a case that the display screen 905 is a touch display screen, the display screen 905 is further capable of collecting a touch signal on or over a surface of the display screen 905. The touch signal may be inputted into the processor 901 as a control signal for processing. In this case, the display screen 905 may be further configured to provide a virtual button and/or a virtual keyboard, also referred to as a soft button and/or a soft keyboard. In some embodiments, there is one display screen 905, disposed on a front panel of the terminal 900. In some other embodiments, there may be two display screens 905, respectively disposed on different surfaces of the terminal 900 or designed in a foldable shape. In still some other embodiments, the display screen 905 may be a flexible display screen, disposed on a curved surface or a folded surface of the terminal 900. Even, the display screen 905 may be further set to have a non-rectangular irregular graph, that is, a special-shaped screen. The display screen 905 may be manufactured by using a material such as a liquid crystal display (LCD), an organic light-emitting diode (OLED), or the like.

The camera component 906 is configured to collect an image or a video. Optionally, the camera component 906 includes a front-facing camera and a rear-facing camera. Generally, the front-facing camera is disposed on the front panel of the terminal 900, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 906 may further include a flash. The flash may be a single color temperature flash or a double color temperature flash. The double color temperature flash refers to a combination of a warm flash and a cold flash, and may be configured to perform light ray compensation at different color temperatures.

The audio circuit 907 may include a microphone and a loudspeaker. The loudspeaker is configured to collect sound waves of a user and an environment, and convert the sound waves into electric signals and input the electrical signals into the processor 901 for processing, or input the electrical signals into the radio frequency circuit 904 to implement speech communication. For the purpose of stereo sound collection or noise reduction, there may be a plurality of microphones, respectively disposed at different parts of the terminal 900. The microphone may be further a microphone array or an omnidirectional collection microphone. The loudspeaker is configured to convert electric signals from the processor 901 or the radio frequency circuit 904 into sound waves. The loudspeaker may be a conventional thin-film loudspeaker or a piezoelectric ceramic loudspeaker. In a case that the loudspeaker is the piezoelectric ceramic loudspeaker, electric signals not only can be converted into sound waves that can be heard by human, but also can be converted into sound waves that cannot be heard by human for ranging and the like. In some embodiments, the audio circuit 907 may further include an earphone jack.

The positioning component 908 is configured to position a current geographic location of the terminal 900, to implement a navigation or a location based service (LBS). The positioning assembly 908 may be a positioning assembly based on the United States' Global Positioning System (GPS), China's BeiDou Navigation Satellite System (BDS), Russia's GLObal NAvigation Satellite System (GLONASS) or the European Union's Galileo System.

The power supply 909 is configured to supply power to components in the terminal 900. The power supply 909 may be an alternating current, a direct current, a primary battery, or a rechargeable battery. In a case that the power supply 909 includes the rechargeable battery, the rechargeable battery may support wired charging or wireless charging. The rechargeable battery may be further configured to support a quick charge technology.

In some embodiments, the terminal 900 further includes one or more sensors 910. The one or more sensors 910 include, but are not limited to, an acceleration sensor 911, a gyroscope sensor 912, a pressure sensor 913, a fingerprint sensor 914, an optical sensor 915, and a proximity sensor 916.

The acceleration sensor 911 may detect acceleration on three coordinate axes of a coordinate system established by the terminal 900. For example, the acceleration sensor 911 may be configured to detect components of gravity acceleration on the three coordinate axes. The processor 901 may control, according to a gravity acceleration signal collected by the acceleration sensor 911, the display screen 905 to display the user interface in a frame view or a portrait view. The acceleration sensor 911 may be further configured to collect motion data of a game or a user.

The gyroscope sensor 912 may detect a body direction and a rotation angle of the terminal 900. The gyroscope sensor 912 may cooperate with the acceleration sensor 911 to collect a 3D action by the user on the terminal 900. The processor 901 may implement the following functions according to data collected by the gyroscope sensor 912: motion sensing (for example, the UI is changed according to a tilt operation of the user), image stabilization during shooting, game control, and inertial navigation.

The pressure sensor 913 may be disposed on a side frame of the terminal 900 and/or a lower layer of the display screen 905. When the pressure sensor 913 is disposed on the side frame of the terminal 900, a holding signal of the user on the terminal 900 may be detected. The processor 901 performs left and right hand recognition or a quick operation according to the holding signal collected by the pressure sensor 913. When the pressure sensor 913 is disposed on the low layer of the display screen 905, the processor 901 controls, according to a pressure operation of the user on the display screen 905, an operable control on the UI. The operable control includes at least one of a button control, a scroll bar control, an icon control, and a menu control.

The fingerprint sensor 914 is configured to collect a fingerprint of the user. The processor 901 identifies an identity of the user according to the fingerprint collected by the fingerprint sensor 914, or the fingerprint sensor 914 identifies an identity of the user according to the collected fingerprint. In a case that the identity of the user is identified as a trusted identity, the processor 901 authorizes the user to perform a related sensitive operation. The sensitive operation includes unlocking a screen, viewing encrypted information, downloading software, payment, changing settings, and the like. The fingerprint sensor 914 may be disposed on a front face, a back face, or a side face of the terminal 900. When a physical button or a vendor logo is disposed on the terminal 900, the fingerprint 914 may be integrated with the physical button or the vendor logo.

The optical sensor 915 is configured to collect ambient light intensity. In an embodiment, the processor 901 may control display luminance of the display screen 905 according to the ambient light intensity collected by the optical sensor 915. Specifically, in a case that the ambient light intensity is relatively high, the display luminance of the display screen 905 is increased. In a case that the ambient light intensity is relatively low, the display luminance of the display screen 905 is reduced. In another embodiment, the processor 901 may further dynamically adjust shooting parameters of the camera component 906 according to the ambient light intensity collected by the optical sensor 915.

The proximity sensor 916, also referred to as a distance sensor, is usually disposed on the front panel of the terminal 900. The proximity sensor 916 is configured to collect a distance between a front face of the user and the front face of the terminal 900. In an embodiment, when the proximity sensor 916 detects that the distance between the front face of the user and the front face of the terminal 900 is gradually decreased, the processor 901 controls the display screen 905 to switch from a screen-on state to a screen-off state. When the proximity sensor 916 detects that the distance between the front face of the user and the front face of the terminal 900 is gradually increased, the processor 901 controls the display screen 905 to switch from the screen-off state to the screen-on state.

A person skilled in the art may understand that the structure shown in FIG. 9 does not constitute a limitation to the terminal 900, and the terminal may include more components or fewer components than those shown in the figure, or some components may be combined, or a different component deployment may be used.

An embodiment of this application further provides a position and pose determining apparatus. The position and pose determining apparatus includes a processor and a memory. The memory stores at least one instruction, at least one program, a code set, or an instruction set. The instruction, program, code set, or instruction set is loaded by the processor and has operations to implement the position and pose determining method in the foregoing embodiment.

An embodiment of this application further provides a computer readable storage medium. The computer readable storage medium stores at least one instruction, at least one program, a code set, or an instruction set. The instruction, the program, the code set, or the instruction set is loaded by the processor and has operations to implement the position and pose determining method in the foregoing embodiment.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A position and pose determining method, the method being applied to an electronic device having one or more processors and memory storing a plurality of programs to be executed by the one or more processors, and the method comprising:
    acquiring, by tracking a first feature point extracted from a marked image, position and pose parameters of a first image captured by a camera relative to the marked image;
    extracting a second feature point from the first image in a case that the first image fails to meet a feature point tracking condition, the second feature point being different from the first feature point; and
    acquiring, by tracking the first feature point and the second feature point, position and pose parameters of a second image captured by the camera relative to the marked image, and determining a position and a pose of the camera according to the position and pose parameters, the second image being an image captured by the camera after the first image.

2. The method according to claim 1, wherein before the acquiring, by tracking a first feature point extracted from a marked image, position and pose parameters of a first image captured by a camera relative to the marked image, the method further comprises:
    dividing the marked image into a plurality of grid areas of a same size;
    acquiring a weight of each feature point extracted from the marked image, the weight of the feature point being used for representing a gradient of the feature point; and
    extracting, as the first feature point, a feature point with the highest weight from each of the divided grid areas, until the first feature point is extracted from all of the grid areas in the marked image or until a number of the first feature points extracted from the marked image reaches a preset number.

3. The method according to claim 1, further comprising:
    acquiring a number of the first feature points tracked in the first image; and
    determining, in a case that the number fails to reach a preset number, that the first image fails to meet the feature point tracking condition.

4. The method according to claim 1, wherein the extracting a second feature point from the first image in a case that the first image fails to meet a feature point tracking condition comprises:
    dividing the first image into a plurality of grid areas of the same size;
    acquiring a weight of each feature point extracted from the first image, the weight of the feature point being used for representing a gradient of the feature point; and
    extracting, as the second feature point, a feature point with the highest weight in a grid area comprising no first feature point, until the first feature point or the second feature point is extracted from all of the grid areas in the first image, or until a sum of a number of the second feature points extracted from the first image and a number of the first feature points tracked in the first image reaches a preset number.

5. The method according to claim 1, wherein the acquiring, by tracking a first feature point, position and pose parameters of a first image captured by a camera relative to a marked image comprises:
    acquiring, by tracking the first feature point, a homography matrix of the first image relative to the marked image;
    decomposing the homography matrix according to a preset constraint condition that a rotation-displacement matrix is to meet, to obtain a rotation-displacement matrix of the first image relative to the marked image; and
    acquiring the position and pose parameters of the first image relative to the marked image from the rotation-displacement matrix.

6. The method according to claim 5, wherein the acquiring, by tracking the first feature point, a homography matrix of the first image relative to the marked image comprises:
    acquiring a homography matrix of each image relative to a previous image by tracking the first feature point in each image from a next image of the marked image to the first image; and
    iteratively processing the homography matrix of each image relative to the previous image to obtain the homography matrix of the first image relative to the marked image.

7. The method according to claim 5, wherein the decomposing the homography matrix according to a preset constraint condition that a rotation-displacement matrix is to meet, to obtain the rotation-displacement matrix of the first image relative to the marked image comprises:
    decomposing the homography matrix according to the preset constraint condition to obtain a rotation-displacement matrix of the first image relative to the marked image in a first coordinate system, the first coordinate system being a coordinate system formed through translating an image coordinate system of the marked image by one unit toward a negative direction of a z axis; and transforming the rotation-displacement matrix of the first image relative to the marked image in the first coordinate system according to a transformation relationship between the first coordinate system and the image coordinate system of the marked image to obtain the rotation-displacement matrix of the first image relative to the marked image.

8. The method according to claim 1, wherein before the acquiring, by tracking a first feature point, position and pose parameters of a first image captured by a camera relative to a marked image, the method further comprises:

acquiring the image captured by the camera in a case that no marked image is set; and determining the captured image as the marked image in a case that a number of feature points extracted from the captured image reaches a preset number.

9. The method according to claim 1, wherein the position and pose parameters comprise a displacement parameter, and the method further comprises:

acquiring a plurality of rotation parameters and corresponding time stamps of the camera through an inertial measurement unit (IMU), and performing interpolation according to the plurality of rotation parameters and the corresponding time stamps to obtain a rotation parameter curve; and acquiring, as a rotation parameter of the first image, a corresponding rotation parameter of a time stamp of the first image in the rotation parameter curve.

10. An electronic device, comprising a memory and one or more processors, and a plurality of programs stored in the memory, wherein the plurality of programs, when executed by the one or more processors, cause the electronic device to perform a plurality of operations including:

acquiring, by tracking a first feature point extracted from a marked image, position and pose parameters of a first image captured by a camera relative to the marked image;

extracting a second feature point from the first image in a case that the first image fails to meet a feature point tracking condition, the second feature point being different from the first feature point; and acquiring, by tracking the first feature point and the second feature point, position and pose parameters of a second image captured by the camera relative to the marked image, and determining a position and a pose of the camera according to the position and pose parameters, the second image being an image captured by the camera after the first image.

11. The electronic device according to claim 10, wherein the plurality of operations further comprise:

before acquiring, by tracking a first feature point extracted from a marked image, position and pose parameters of a first image captured by a camera relative to the marked image:

dividing the marked image into a plurality of grid areas of a same size;

acquiring a weight of each feature point extracted from the marked image, the weight of the feature point being used for representing a gradient of the feature point; and extracting, as the first feature point, a feature point with the highest weight from each of the divided grid areas, until the first feature point is extracted from all of the grid areas in the marked image or until a number of the first feature points extracted from the marked image reaches a preset number.

12. The electronic device according to claim 10, wherein the plurality of operations further comprise:

acquiring a number of the first feature points tracked in the first image; and determining, in a case that the number fails to reach a preset number, that the first image fails to meet the feature point tracking condition.

13. The electronic device according to claim 10, wherein the extracting a second feature point from the first image in a case that the first image fails to meet a feature point tracking condition comprises:

dividing the first image into a plurality of grid areas of the same size;

acquiring a weight of each feature point extracted from the first image, the weight of the feature point being used for representing a gradient of the feature point; and extracting, as the second feature point, a feature point with the highest weight in a grid area comprising no first feature point, until the first feature point or the second feature point is extracted from all of the grid areas in the first image, or until a sum of a number of the second feature points extracted from the first image and a number of the first feature points tracked in the first image reaches a preset number.

14. The electronic device according to claim 10, wherein the acquiring, by tracking a first feature point, position and pose parameters of a first image captured by a camera relative to a marked image comprises:

acquiring, by tracking the first feature point, a homography matrix of the first image relative to the marked image;

decomposing the homography matrix according to a preset constraint condition that a rotation-displacement matrix is to meet, to obtain a rotation-displacement matrix of the first image relative to the marked image; and acquiring the position and pose parameters of the first image relative to the marked image from the rotation-displacement matrix.

15. The electronic device according to claim 14, wherein the acquiring, by tracking the first feature point, a homography matrix of the first image relative to the marked image comprises:

acquiring a homography matrix of each image relative to a previous image by tracking the first feature point in each image from a next image of the marked image to the first image; and iteratively processing the homography matrix of each image relative to the previous image to obtain the homography matrix of the first image relative to the marked image.

16. The electronic device according to claim 14, wherein the decomposing the homography matrix according to a preset constraint condition that a rotation-displacement matrix is to meet, to obtain the rotation-displacement matrix of the first image relative to the marked image comprises:

decomposing the homography matrix according to the preset constraint condition to obtain a rotation-displacement matrix of the first image relative to the marked image in a first coordinate system, the first coordinate system being a coordinate system formed through translating an image coordinate system of the marked image by one unit toward a negative direction of a z axis; and transforming the rotation-displacement matrix of the first image relative to the marked image in the first coordinate system according to a transformation relationship between the first coordinate system and the image coordinate system of the marked image to obtain the rotation-displacement matrix of the first image relative to the marked image.

17. The electronic device according to claim 10, wherein the plurality of operations further comprise:

before acquiring, by tracking a first feature point, position and pose parameters of a first image captured by a camera relative to a marked image:

acquiring the image captured by the camera in a case that no marked image is set; and determining the captured image as the marked image in a case that a number of feature points extracted from the captured image reaches a preset number.

18. The electronic device according to claim 10, wherein the position and pose parameters comprise a displacement parameter, and the plurality of operations further comprise:

acquiring a plurality of rotation parameters and corresponding time stamps of the camera through an inertial measurement unit (IMU), and performing interpolation according to the plurality of rotation parameters and the corresponding time stamps to obtain a rotation parameter curve; and acquiring, as a rotation parameter of the first image, a corresponding rotation parameter of a time stamp of the first image in the rotation parameter curve.

19. A non-transitory computer-readable storage medium storing a plurality of programs that, when executed by one or more processors of an electronic device, cause the electronic device to perform a plurality of operations including:

acquiring, by tracking a first feature point extracted from a marked image, position and pose parameters of a first image captured by a camera relative to the marked image;

extracting a second feature point from the first image in a case that the first image fails to meet a feature point tracking condition, the second feature point being different from the first feature point; and acquiring, by tracking the first feature point and the second feature point, position and pose parameters of a second image captured by the camera relative to the marked image, and determining a position and a pose of the camera according to the position and pose parameters, the second image being an image captured by the camera after the first image.

20. The non-transitory computer-readable storage medium according to claim 19, wherein the plurality of operations further comprise:

before acquiring, by tracking a first feature point extracted from a marked image, position and pose parameters of a first image captured by a camera relative to the marked image:

dividing the marked image into a plurality of grid areas of a same size;

acquiring a weight of each feature point extracted from the marked image, the weight of the feature point being used for representing a gradient of the feature point; and extracting, as the first feature point, a feature point with the highest weight from each of the divided grid areas, until the first feature point is extracted from all of the grid areas in the marked image or until a number of the first feature points extracted from the marked image reaches a preset number.

* * * * *